United States Patent
Siebenlist

(10) Patent No.: US 12,194,554 B2
(45) Date of Patent: Jan. 14, 2025

(54) METHOD AND DEVICE FOR DEBURRING A WORKPIECE WITH AN INNER TOOTHING

(71) Applicant: Schaeffler Technologies AG & Co. KG, Herzogenaurach (DE)

(72) Inventor: Norbert Siebenlist, Poppenhausen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 286 days.

(21) Appl. No.: 17/770,695

(22) PCT Filed: Nov. 16, 2020

(86) PCT No.: PCT/DE2020/100973
§ 371 (c)(1),
(2) Date: Apr. 21, 2022

(87) PCT Pub. No.: WO2021/098915
PCT Pub. Date: May 27, 2021

(65) Prior Publication Data
US 2022/0371114 A1    Nov. 24, 2022

(30) Foreign Application Priority Data

Nov. 20, 2019    (DE) ..................... 10 2019 131 266.3

(51) Int. Cl.
*B23F 19/10*    (2006.01)
*B23B 27/00*    (2006.01)
(Continued)

(52) U.S. Cl.
CPC ............ *B23F 19/10* (2013.01); *B23B 27/007* (2013.01); *B23B 27/14* (2013.01); *B23B 27/24* (2013.01);
(Continued)

(58) Field of Classification Search
CPC .......... B23F 19/10; B23F 21/00; B23F 19/00; B23F 23/00; B23B 27/007; B23B 27/14;
(Continued)

(56) References Cited

U.S. PATENT DOCUMENTS 3,233,518 A * 2/1966 Paulger ................... B23F 19/10
409/8
3,714,740 A    2/1973 Steinhardt
(Continued)

FOREIGN PATENT DOCUMENTS

CN    105458412 A    4/2016
CN    106457431 A    2/2017
(Continued)

*Primary Examiner* — Sarang Afzali
*Assistant Examiner* — Darrell C Ford

(57) ABSTRACT

A method for deburring an internally toothed workpiece includes providing a workpiece and a deburring tool. The workpiece has an inner toothing produced by hob peeling, with first and second tooth flanks. The deburring tool has a first cutting plate and a second cutting plate, diametrically opposed to the first cutting plate. The method includes rotating the workpiece in a first rotating direction and deburring the first tooth flanks with the first cutting plate while the deburring tool is not rotating. The method also includes shifting the deburring tool relative to the workpiece such that the first cutting plate and the second cutting plate do not contact the workpiece, rotating the workpiece in a second rotating direction, opposite the first rotating direction, further shifting the deburring tool relative to the workpiece, and deburring the second tooth flanks with the second cutting plate while the deburring tool is not rotating.

4 Claims, 3 Drawing Sheets

(51) Int. Cl.
*B23B 27/14* (2006.01)
*B23B 27/24* (2006.01)
*B23B 29/24* (2006.01)

(52) U.S. Cl.
CPC ...... *B23B 29/24* (2013.01); *B23B 2200/0447* (2013.01); *B23B 2220/08* (2013.01); *B23B 2270/14* (2013.01)

(58) Field of Classification Search
CPC . B23B 27/24; B23B 29/24; B23B 2200/0447; B23B 2220/08; B23B 2270/14; Y10T 29/49462; Y10T 29/49467; Y10T 29/49476; Y10T 29/49478
See application file for complete search history.

(56) References Cited

U.S. PATENT DOCUMENTS

| | | | | |
|---|---|---|---|---|
| 5,052,865 | A | * | 10/1991 | Kaczmarek ............ B23F 21/00 409/9 |
| 5,951,213 | A | | 9/1999 | Fauser et al. |
| 2005/0000072 | A1 | | 1/2005 | Wolff |
| 2005/0207858 | A1 | | 9/2005 | Muller et al. |
| 2011/0044777 | A1 | * | 2/2011 | Senjo ................. B23C 3/12 409/8 |
| 2013/0121779 | A1 | * | 5/2013 | Geiser ................ B23F 19/10 409/8 |
| 2018/0079019 | A1 | | 3/2018 | Heyn |
| 2024/0009745 | A1 | * | 1/2024 | Schieke ............... B23F 21/122 |

FOREIGN PATENT DOCUMENTS

| | | |
|---|---|---|
| CN | 106825785 A | 6/2017 |
| CN | 107530803 A | 1/2018 |
| CN | 107717136 A | 2/2018 |
| DE | 3608458 C1 | 3/1987 |
| DE | 19624342 C1 | 12/1997 |
| DE | 10258549 A1 | 5/2004 |
| DE | 10309116 A1 | 9/2004 |
| DE | 202005011790 U1 | 10/2005 |
| DE | 202011050704 U1 | 10/2012 |
| DE | 102014008475 A1 | 12/2015 |
| DE | 102014010824 A1 | 1/2016 |
| DE | 102014218082 A1 | 3/2016 |
| DE | 102015104242 A1 | 9/2016 |
| DE | 102017204891 A1 | 9/2018 |
| EP | 2269753 A1 | 1/2011 |
| EP | 2537615 A1 | 12/2012 |
| JP | S5766816 A | 4/1982 |
| JP | S60207701 A | 10/1985 |
| JP | S6234720 A | 2/1987 |
| JP | S6236570 U | 3/1987 |
| JP | H1094919 A | 4/1998 |
| JP | 2011131345 A | 7/2011 |
| JP | 2016508453 A | 3/2016 |
| JP | 2017100269 A | 6/2017 |
| JP | 2017520416 A | 7/2017 |
| KR | 1020170012299 A | 2/2017 |
| WO | 2015036098 A2 | 3/2015 |
| WO | 2015185186 A1 | 12/2015 |

* cited by examiner

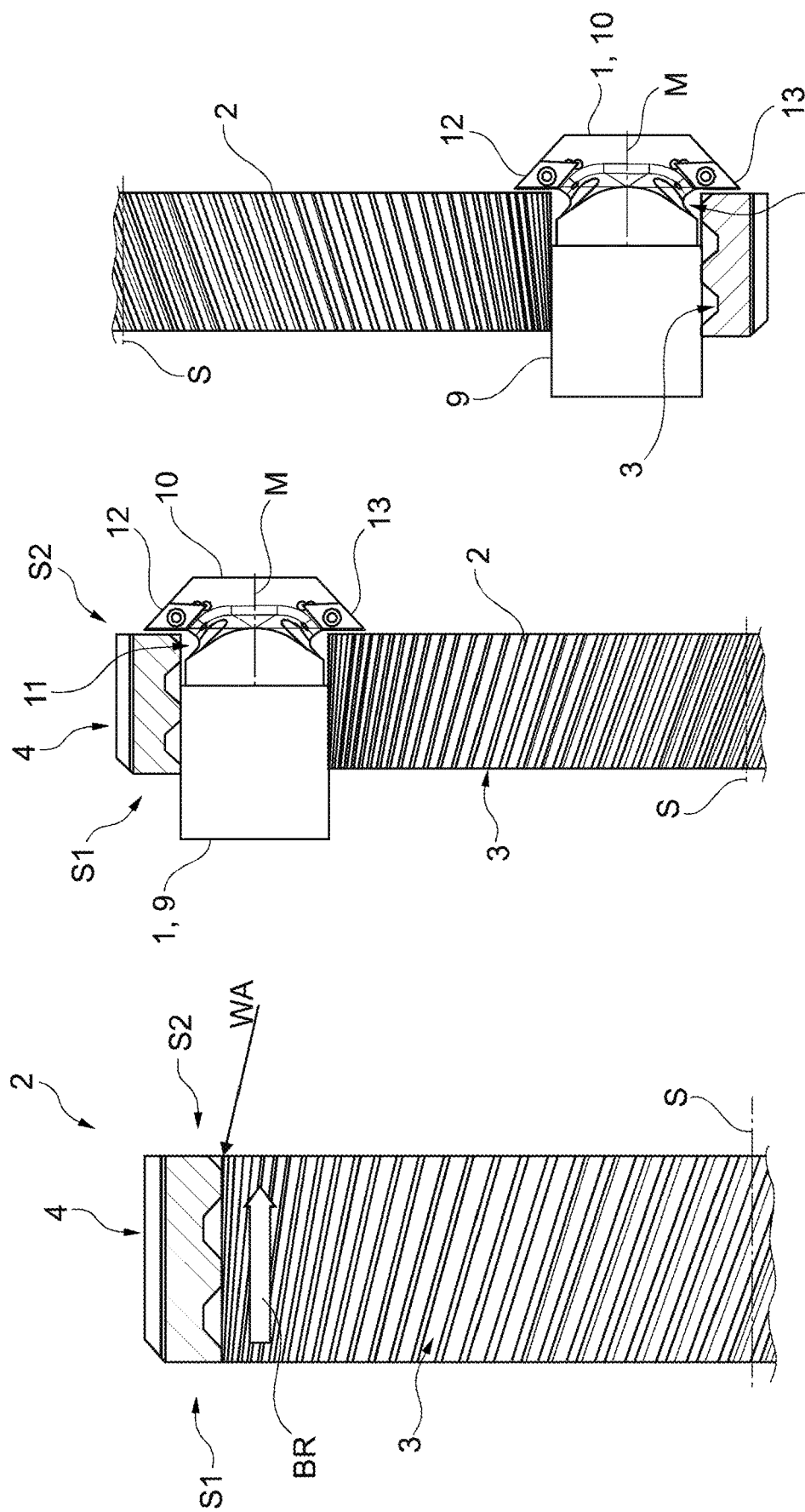

METHOD AND DEVICE FOR DEBURRING A WORKPIECE WITH AN INNER TOOTHING

CROSS-REFERENCE TO RELATED APPLICATIONS

This application is the United States National Phase of PCT Appln. No. PCT/DE2020/100973 filed Nov. 16, 2020, which claims priority to German Application No. DE102019131266.3 filed Nov. 20, 2019, the entire disclosures of which are incorporated by reference herein.

TECHNICAL FIELD

The present disclosure relates to a method for deburring a workpiece which has an inner toothing. The disclosure further relates to a deburring tool suitable for carrying out such a method.

BACKGROUND

Toothing of workpieces can be produced efficiently, for example by hob peeling. In this context, reference is made by way of example to the publications DE 10 2014 008 475 A1, EP 2 537 615 A1 and WO 2015/036098 A2. The last-mentioned publication deals in particular with cooling during hob peeling.

Hob peeling is also fundamentally suitable for producing a chamfer on a workpiece. Details of corresponding machining methods are disclosed in DE 10 2017 204 891 A1 and DE 10 2014 218 082 A1.

As with other machining processes, hob peeling can cause burrs on the workpiece, which must be removed in a subsequent machining step. With regard to possible designs of devices for deburring, reference is made to the publications DE 36 08 458 C1, DE 103 09 116 A1 and DE 10 2014 010 824 A1.

SUMMARY

The present disclosure provides a method for deburring an internally toothed workpiece. The configurations and advantages of the disclosure explained below in connection with the device, i.e., the deburring tool, also apply mutatis mutandis to the deburring process and vice versa.

The deburring process includes the following steps:
provisioning of a workpiece having an axis of symmetry with an inner toothing produced by hob peeling,
provisioning of a deburring tool having at least a first cutting plate and a second cutting plate, wherein the cutting plates are diametrically opposed with respect to a center axis of the deburring tool,
rotation of the workpiece in a first rotating direction, wherein tooth flanks of the inner toothing are deburred with the deburring tool which does not rotate during this process, by means of the first cutting plate, and the center axis of the deburring tool is arranged to be parallel to the axis of symmetry of the workpiece,
shifting of the deburring tool relative to the workpiece while maintaining the parallelism between the axis of symmetry and the center axis in such a way that none of the cutting plates contact the workpiece,
reversal of the rotating direction of the workpiece, and
further shifting of the deburring tool relative to the workpiece while maintaining the parallelism between the axis of symmetry and the center axis and deburring of tooth flanks of the inner toothing with the deburring tool, which does not rotate during this process, by means of the second cutting plate.

The terms "axis of symmetry" (always in connection with the workpiece) and "center axis" (always in connection with the deburring tool) are only chosen for the purpose of linguistic distinction and do not imply any information about differences between the symmetry properties of the workpiece on the one hand and the tool on the other hand.

In addition to the inner toothing, the workpiece optionally has an outer toothing. The production and possible deburring of such a toothing on the outer circumferential surface of the overall annular workpiece can be carried out in any conventional manner, wherein the deburring tool is not used in this case.

In an example method, both the first cutting plate and the second cutting plate deburr the end face of the inner toothing of the workpiece. The shape of both cutting plates may be identical. The cutting plates are conventionally made of carbide, for example. In this context, reference is made by way of example to publication DE 20 2011 050 704 U1.

The workpiece used for deburring has a T-shaped base form, which is formed by a shaft aligned along the center axis and a cutting plate holding section arranged transversely to the shaft. Two cutting plates diametrically opposite to one another with respect to the center axis are fixed to the cutting plate holding section constituting the cross bar of the T, wherein the cutting edges of the cutting plates provided for deburring face the shaft.

Throughout the method carried out successively with the two cutting plates, the shaft of the deburring tool may remain arranged in the cavity of the workpiece enclosed by the inner toothing.

The cutting edges of the cutting plates, which are in engagement with the workpiece during the successive deburring operations, are aligned approximately along one and the same straight line. For example, an angle of at least 165° and at most 178° is formed between the cutting edges. Smaller or larger angles formed between the cutting edges, in particular an angle of 180°, are also possible. The cutting plates are, for example, indexable inserts which are soldered, clamped or screwed onto the base body of the deburring tool.

An idle stroke of the hob peeling can be performed between machining the internally toothed workpiece with the first cutting plate and machining the workpiece with the second cutting plate. Overall, hob peeling can involve multiple passes, first as roughing, then as finishing.

In contrast to common milling cutters, such as those described in DE 196 24 342 C1, in which several cutting plates arranged on the circumference of the cutter point in the same circumferential direction, in the deburring tool according to the application, which replaces a lathe tool, the cutting plates are oriented in opposite circumferential directions. This means that when looking at the deburring tool, for example, the tops of both cutting plates are visible. In particular, the upper surfaces of both cutting plates lie in a common plane. One of the cutting plates is used, for example, to deburr all the left-hand tooth flanks of the inner toothing, whereas the other cutting plate is provided specifically for deburring the right-hand tooth flanks. After the double flank deburring performed with the deburring tool, no additional operation for mechanical machining of the inner toothing is required in typical applications.

In summary, a workpiece, namely an internally toothed gear, is deburred with a non-rotating deburring tool which has two cutting plates in that the workpiece is first rotated in a first rotating direction, wherein tooth flanks of the inner toothing of the workpiece are deburred by means of the first cutting plate, and other tooth flanks of the inner toothing are deburred by means of the second cutting plate in a later machining phase in which the workpiece is rotated in the opposite direction.

BRIEF DESCRIPTION OF THE DRAWINGS

In the following, an exemplary embodiment is explained in more detail by means of a drawing. In the figures:

FIG. 1 shows a sectional view of an internally toothed workpiece,

FIG. 2 shows the workpiece during a first deburring process performed with a deburring tool, FIG. 3 shows the workpiece during a second deburring process performed with the deburring tool.

DETAILED DESCRIPTION

Figure 4:
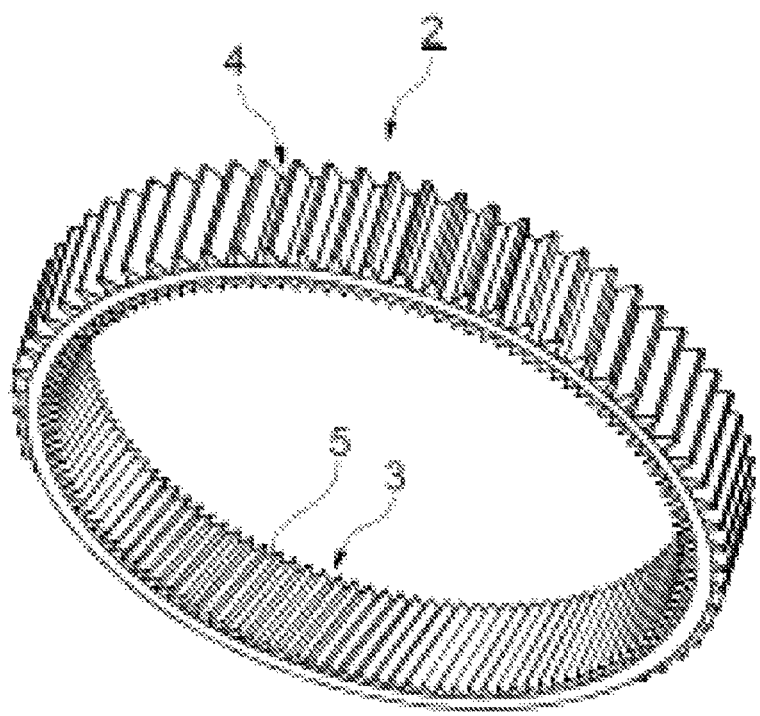
FIG. 4 shows a perspective view of the internally toothed workpiece.

A workpiece 2, shown in isolation in FIGS. 1 and 4, is machined with a deburring tool 1, also referred to as a tool for short, in a method illustrated in FIGS. 2 and 3.

The starting point of the machining process is the provisioning of the workpiece 2 in the state shown in FIG. 1, in which an inner toothing of the workpiece 2, i.e., gear, designated 3, is already present. The inner toothing 3 was previously produced by hob peeling in a manner known per se. In addition, the workpiece 2 has an outer toothing 4, which is not machined in the method explained with reference to the figures.

In the present case, the inner toothing 3 is designed as a helical toothing, the individual teeth of which are designated 5. Each tooth 5 has two flanks 6, 7, i.e., tooth flanks, which adjoin the end faces of the gear 2 designated S1, S2. During hob peeling, the workpiece 2 was machined in the direction from the first end face S1 to the second end face S2. Hob peeling involves roughing in multiple passes followed by finishing in one to two passes. The machining direction BR is marked with an arrow in FIG. 1. At the tool exit WA, i.e., on the second end face S2, hob peeling results in burrs on the edges 8 of the tooth flanks 6, 7 and the tooth bases designated 17.

Figure 5:
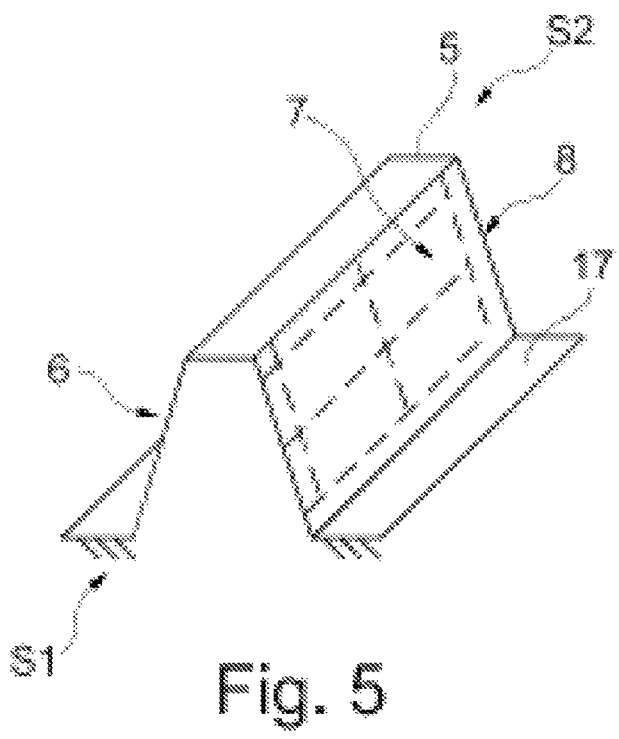
FIG. 5 shows a tooth of the inner toothing of the workpiece.
Figure 6:
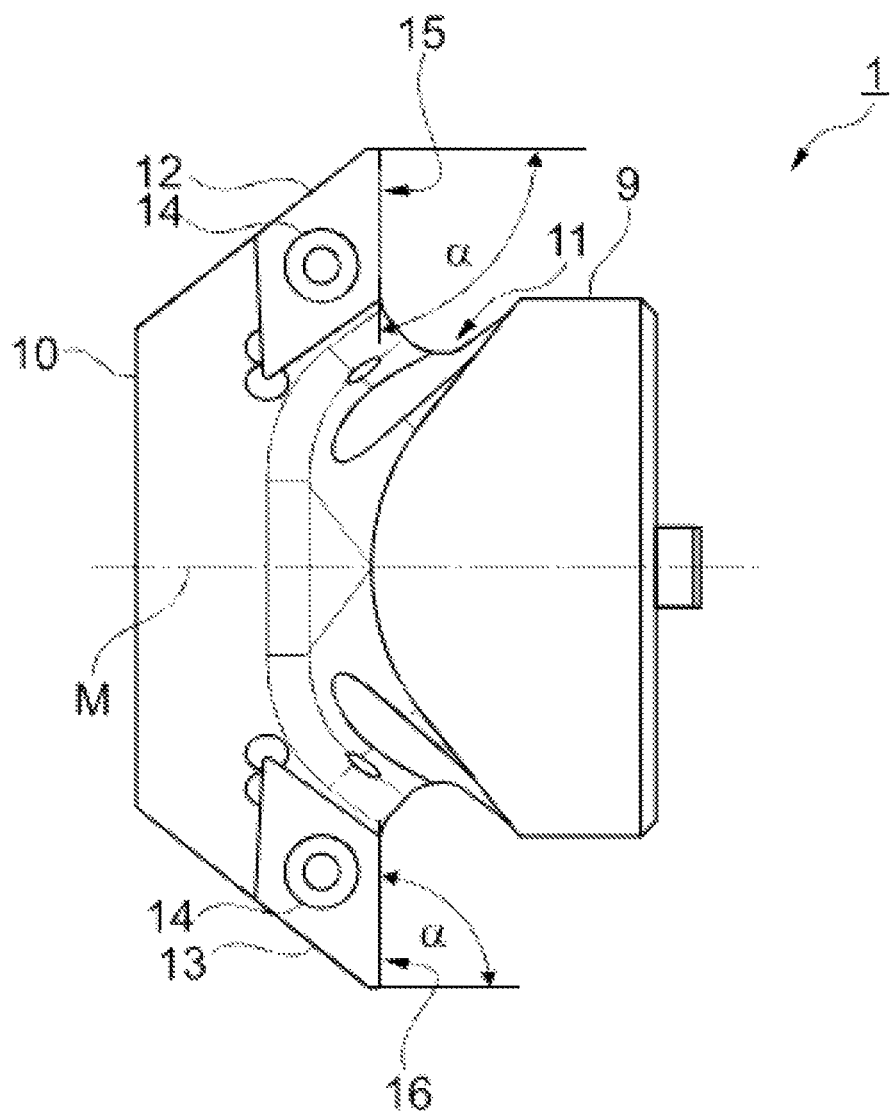

The tool 1 used to deburr the teeth 5 describes a T-shape shown in FIGS. 2, 3 and 5, with a shaft 9 and a T-crosspiece 10 adjoining it, which acts as a cutting plate holding section. A constriction 11 can be seen between the shaft 9 and the cutting plate holding section 10. The shaft 9 has a center axis M which, in the arrangements shown in FIGS. 2 and 3, is aligned in parallel to the axis of symmetry of the workpiece 2, designated S. In these arrangements, the shaft 9 is located within the cavity enclosed by the inner toothing 3. Viewed from a holder of the shaft 9, which is not shown, the end face S2 of the workpiece 2 to be machined with the tool 1 thus represents its rear side.

Two cutting plates 12, 13, namely indexable inserts, are attached to the T-crosspiece 10 of the tool 1 with screws 14. With respect to a plane passing through the center axis M, the cutting plates 12, 13 are designed to be mirror symmetrical to one another. The symmetry also applies to any clamping pieces. Each cutting plate 12, 13 has a cutting edge 15, 16 to be used in the present method. An angle $\alpha$ is formed between each cutting edge 15, 16 and a straight line parallel to the center axis M, as shown in FIG. 5. In the exemplary embodiment, the angle $\alpha$ corresponds to 87.2°. Thus, in the present case, an angle ($2\times\alpha$) of 174.4° is formed between the two cutting edges 15, 16, which are provided for machining the end face of the workpiece 2.

When deburring the workpiece 2, the cutting edge 15 of the cutting plate 12 is used first, as illustrated in FIG. 2. The workpiece 2 rotates counterclockwise. The tool 1 does not rotate. This process mainly removes the burrs located on tooth flanks 7.

After completion of this step, an idle stroke of the hob peeling is performed, which is not shown in the figures. The tool 1 is then moved to the position shown in FIG. 3, wherein the angular orientation of the tool 1, relative to the orientation of the T-crosspiece 9, does not change. In the exemplary embodiment shown, this means that the cutting plate 12 is located unchanged above the center axis M and the cutting plate 13 is located unchanged below the center axis M. Of course, the orientation of the axes M, S in space is arbitrary, wherein the axes M, S are always aligned to be parallel to one another during deburring. As an alternative to the arrangement of workpiece 2 and tool 1 shown, a vertical alignment of the axes M, S is possible, for example.

In the state shown in FIG. 3, the workpiece 2 rotates clockwise, wherein mainly the butts on the tooth flanks 6 are removed. Further machining steps for deburring the workpiece 2, such as brushing, are usually not required. Compared with conventional deburring processes, this ensures particularly rational and at the same time efficient machining.

REFERENCE NUMERALS

1 Debarring tool
2 Workpiece, with an inner toothing
3 Inner toothing
4 Outer toothing
5 Tooth
6 Tooth flank
7 Tooth flank
8 Edge
9 Shaft
10 T-crosspiece, cutting plate holding section
11 Constriction
12 Cutting plate
13 Cutting plate
14 Screw
15 Cutting edge
16 Cutting edge
17 Tooth base
$\alpha$ Angle
BR Machining direction
M Center axis
S Axis of symmetry
S1 End face
S2 End face
WA Tool exit

The invention claimed is:

1. A method for deburring an internally toothed workpiece, comprising:
  providing a workpiece having:
    an axis of symmetry; and
    an inner toothing produced by hob peeling, the inner toothing comprising first tooth flanks and second tooth flanks;
  providing a deburring tool having:
    a center axis;

a first cutting plate; and a second cutting plate, diametrically opposed to the first cutting plate with respect to the center axis;

aligning the center axis to be parallel to the axis of symmetry;

rotating the workpiece in a first rotating direction;

deburring the first tooth flanks with the first cutting plate while the deburring tool is not rotating;

keeping the center axis parallel to the axis of symmetry and shifting the deburring tool relative to the workpiece such that the first cutting plate and the second cutting plate do not contact the workpiece;

rotating the workpiece in a second rotating direction, opposite the first rotating direction;

keeping the center axis parallel to the axis of symmetry and further shifting the deburring tool relative to the workpiece; and deburring the second tooth flanks with the second cutting plate while the deburring tool is not rotating.

2. The method of claim 1, wherein:

the workpiece comprises an end face; and the end face is deburred by the first cutting plate and the second cutting plate.

3. The method of claim 2, wherein:

the workpiece comprises a cavity enclosed by the inner toothing;

the deburring tool comprises a shaft; and the shaft remains arranged in the cavity during the entire deburring process.

4. The method of claim 1, further comprising performing an idle stroke of the hob peeling between the deburring the first tooth flanks with the first cutting plate and the deburring the second tooth flanks with the second cutting plate.

* * * * *